Patented Nov. 7, 1950

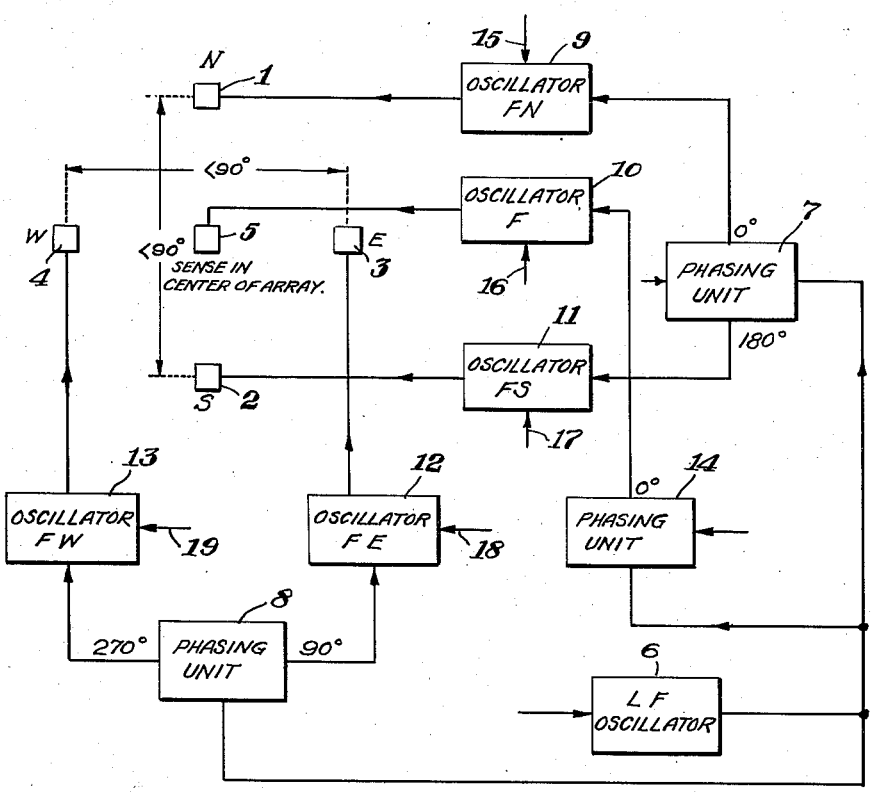

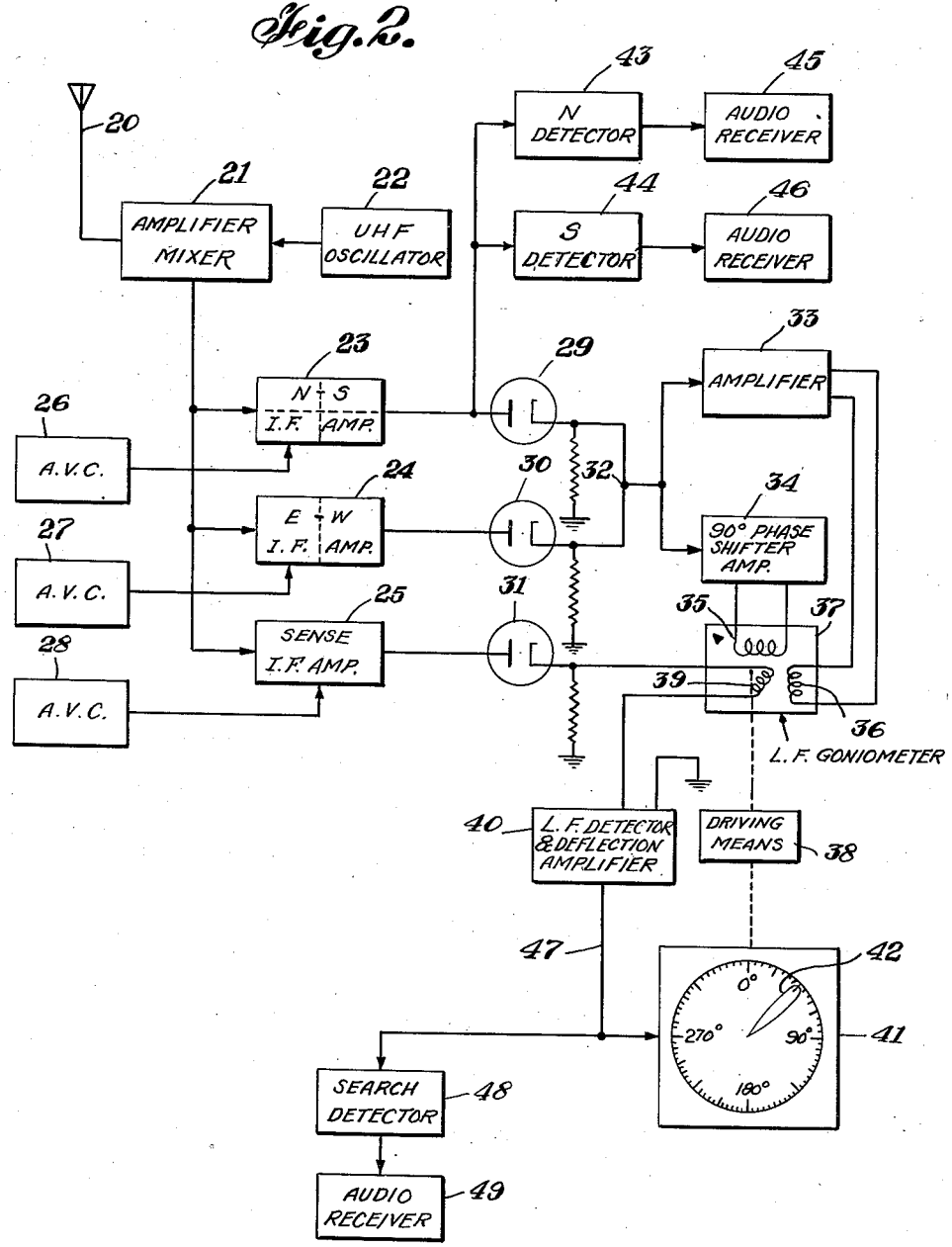

2,528,549

UNITED STATES PATENT OFFICE 2,528,549

DIRECTION FINDING SYSTEM

Avery Groat Richardson, Boonton, N. J., and Frank O. Chesus, Bayport, N. Y., assignors to Federal Telephone and Radio Corporation, New York, N. Y., a corporation of Delaware Application December 1, 1947, Serial No. 789,060

13 Claims. (Cl. 343—106)

This invention relates to radio range systems, particularly of the type where the transmitter comprises a plurality of antenna systems and the receiver a single antenna system.

Briefly the system to which this invention relates involves a radio beacon using a large spacing between several antennae and generating a cardioid shaped radiation pattern provided with a reference mark for determining the bearings of a receiver with respect to the beacon. The rotating pattern is obtained by combining the radiation field of four Adcock antennae operating at different frequencies and modulated with voltages which are in phase quadrature, with the radiation pattern of an antenna operating at still a different frequency and also modulated with a voltage which serves as a modulation phase reference. A receiver suitable for use with a radio beacon of this type comprises a single antenna and two I. F. channels and one low frequency goniometer and synchronized indicator.

An object of this invention is to provide an improved radio range system which will give an instantaneous indication with a high degree of accuracy in the ultra high frequency ranges.

Another object of this invention is to make the transmitter a multiple antenna system and/or a receiver a single antenna system, the transmitter antennae being operated at different carrier frequencies.

Another object of this invention is to provide a radio range system whereby separate signals for audio channels may be simultaneously transmitted from each one of the transmitting antennae and these signals may be also visually observed on a cathode ray screen of the direction indicator.

The above mentioned and other features and objects of this invention will become more apparent and the invention itself though not necessarily defined by said features and objects will be best understood by reference to the following description of an embodiment of the invention taken in connection with the accompanying drawings wherein:

Fig. 1 illustrates a schematic block wiring diagram of a transmitter system incorporating features of my invention; and Fig. 2 illustrates a receiver used in conjunction with the embodiment described in Figure 1.

Fig. 1 shows a transmitting system having five ultra high frequency antennae 1, 2, 3, 4 and 5. One pair of antennae 1, 2 are designated as north and south and the other pair, quadrature spaced antennas 3, 4, as east and west. The center antenna 5 is the sense antenna. Each of these five antennae transmits a non-directional ultra high frequency carrier of a different wave-length. The carrier of each antenna is modulated by energy from source 6 of a lower frequency, having different phase relation as indicated in degrees from the output leads of the low frequency phasing circuits 7 and 8. The antennae 1, 2, 3 and 4 are spaced from each other less than one quarter of the wavelength of the modulating frequency. Ultra high frequency oscillators 9, 10, 11, 12 and 13, provide different frequencies sufficiently separated as not to interfere with each other or with the low frequency modulating energy or any audio or signal frequency which may be transmitted over any one or all of the antennae. For example, the frequency FN of generator 9 may be 100 megacycles, FS of generator 11 may be 100.01 megacycles, FE of generator 12 100.05 megacycles and FW of generator 13 105.01 megacycles.

The differences between the frequency of FN and FS or FE and FW should be small with respect to that between FN and FE for reasons which will later be described in connection with the receiver system. Sense antenna 5 and oscillator 10 may then have a frequency F of 103, 95, 107 or 110 megacycles as desired.

Each of the carrier frequencies fed to the antennas is modulated with a lower frequency wave, say for example, a 200 cycle sine wave from low frequency oscillator 6 which is connected to the low frequency phasing units 7, 8 and 14.

Oscillator 9 and sense antenna oscillator 10 are modulated in the same phase. This is for the purpose of providing a reference mark for determining the bearing of the receiver with respect to the beacon. However, the reference mark may be located at any desired phase point. The north and south antennae 1, 2 are shown to be phased 180° apart in their modulation frequency. Similarly, antennas 3 and 4 are phased 180° apart and also 90° out of phase with respect to 1 and 2. This provides four different phases of low frequency energization for each of the four antennae corresponding to the four directions of the compass. The voltages from the four antennae taken together with the voltage from the sense antennae combine to give an effective cardioid shaped pattern at the common modulation frequency. Because of the phasing an effective rotation of the cardioid is produced of which the null will be apparent in the receiver at an angle with respect to the transmitting system dependent upon the position of the receiver.

Each of the separate oscillator generators 9, 10, 11, 12 and 13 is provided with an input line 15, 16, 17, 18 and 19, respectively, over which other audio or low frequency signals may be transmitted. This provides five separate communication channels, one for each of the antennae in the array at the transmitter. Thus, the plane may select any one of five communication channels from the transmitter station and the transmitter station may simultaneously talk with five different planes or other stations.

In the event there is any difference in the strengths of the antennae fields, an automatic volume control system incorporated in the receiver acts to overcome such a difference by adjusting the output at each IF stage of the receiver to be of the same voltage.

Referring now to the receiver diagram shown in Figure 2, there is provided a single omnidirectional antenna 20. Antenna 20 is connected to an ultra high frequency broad band amplifier mixer circuit 21, which may be a superheterodyne circuit with a beating oscillator 22. From this broad band receiver 21 the energy is transmitted to one or more separate IF amplifiers. If the difference between the frequencies of FN and FS or FE and FW is sufficiently small with respect to that between FN and FE, then the FN and FS channel may be combined in one amplifier stage 23 and the FE and FW channel may be combined in another amplifier stage 24 while the sense antenna F may be amplified in a third stage 25. However, if there is sufficient difference of frequency between the various channels, separate IF amplifiers may be provided for each one of the five separate carrier frequencies. Each of these amplifiers 23, 24 and 25 is controlled by separate automatic volume control circuits 26, 27 and 28 which may be adjusted to give the same constant output regardless of the amplitude or voltage of the received signal.

The output of each IF amplifier 23, 24 and 25 is coupled to a separate IF detector stage 29, 30 and 31 each of which comprises a diode rectifier tube with a cathode bias resistor to ground. The IF detectors 29 and 30 are connected together at 32 and jointly coupled to an amplifier circuit 33 and a 90° phase shifter 34. The output of circuits 33 and 34 are applied to the stator coils 35 and 36 respectively of a low frequency goniometer 37 to produce a rotating field at the speed of a modulation frequency determined by the speed of rotation of the driving means 38. The output from the sense IF amplifier 25 and detector 31 is applied to the rotor coil 39 of goniometer 37.

The rotor coil 39 is continuously rotated by driving means 38 so that a voltage is induced in coil 39 which varies in phase determined by the position of the rotor 39 with respect to the stators 35 and 36. By applying the sense voltage, in phase with the north modulated signal, over circuit 25, and detector 31 to the rotating coil 39, a resultant voltage is obtained which is inverted in the circuit 40 and applied to an indicator 41. The turning of the rotor is synchronized with the direction indicator 41 which may be a phase meter, or a cathode ray oscilloscope, as shown, having a screen upon which an inverted cardioid pattern 42 is indicated. The position of the plane with respect to the azimuth position around the transmitting location will determine where the null position of the goniometer rotor occurs. The indication will have only one null so that sense will be automatic and continuous.

The output of the IF amplifier 23 is connected to detectors 43 and 44, separately tuned to each of the two frequencies FN and FS, which are respectively connected to audio receivers 45 and 46. Similarly the IF amplifier 24 may be coupled to east and west detectors not shown and the sense IF amplifier 25 may also have a detector connected to it. Thus the transmitter that is used for either the center antenna or the array antennae can also be modulated by voice for communication purposes without any disturbance to the bearing indicator. To line 47 from the circuit 40 there is connected broad band IF detector 48 to indicate whether any one of the channels to the five different antennae is carrying an audio frequency signal. A monitoring audio receiver 49 is coupled to the output of broad band detector 48.

The circuits of the receiver may be preset so that corresponding frequency separations at different beacons are selected by a simple control such as a push button or dial. For instance, an operator flying a course would select an approaching airport frequency along route, identify his position, follow his route from the radio range bearing and if need be establish contact over the same receiver and transmitter set-up without any change of frequency or adjustment. Airports sufficiently far apart could use the same ultra high frequency without interference.

The omnidirectional range herein disclosed provides a system affording ease of maintenance, low installation cost, ease of operation, accuracy of bearing indication, high degree of stability and a good communication intelligence.

While we have described above the principles of our invention in connection with specific apparatus and particular modifications thereof, it is to be clearly understood that this description is made only by way of example and not as a limitation on the scope of our invention.

What is claimed is:

1. In a radio transmitting system, means for producing a rotating directional radiant energy field comprising means for producing a radiant energy field, said radiant energy field comprising component omnidirectional fields of different frequencies, means for varying the intensity of said component fields to effect said rotating directional field.

2. A system as set forth in claim 1, wherein means for producing said component fields comprises two pairs of quadrature spaced antennas operating at different radio frequencies, and said intensity varying means comprises means for modulating each of said component fields in accordance with voltages which are substantially in phase quadrature relation to produce a rotating directional field.

3. A receiver system for indicating direction with respect to a transmitter system wherein a plurality of radiations of different radio frequencies are varied in intensity in a predetermined manner by a common modulating frequency, comprising means for receiving and segregating said different radiations, means for detecting said separated radiations to derive the modulation signals and means responsive to the detected modulation signals for indicating said direction.

4. In a radio range, means for producing a rotating directional radiant energy field comprising means for producing a radiant energy field, said radiant energy field producing means comprising two pairs of quadrature spaced antennas and a sense antenna operating at different carrier frequencies, means for varying the intensity of the radiant energy supplied to adjacent ones of said antennas substantially in phase quadrature to produce said rotating directional field, means for varying the intensity of the radiant energy supplied to said sense antenna with a given voltage having a predetermined phase relationship with said rotating field, whereby a rotating directional field having sense direction is produced.

5. A system as set forth in claim 4, further comprising means for modulating said different frequencies with other signals, means located at said remote receiver for detecting said other signals.

6. A system as set forth in claim 4 wherein said indicator comprises a cathode ray oscilloscope and said direction is visually indicated as an inverted cardioid pattern on the screen of said oscilloscope.

7. In a radio range system, means for producing a rotating directional radiant energy field comprising means for producing omnidirectional component fields of different frequencies, means for varying the intensity of said component fields to effect said rotating directional field, and means for modulating the energy of each of said component fields with other signals.

8. A radio range system comprising means for producing a radiant energy field, said field comprising omnidirectional component fields of different frequencies, means for varying the intensity of said component fields to effect said rotating directional field, means for modulating the energy of each of said component fields with individual signals, omnidirectional antenna means for receiving energy of said frequencies, means coupled to said antenna means for separating said frequencies, means for detecting and indicating said individual signals from said separated frequencies, means for detecting and combining said separated frequencies to produce quadrature phase spaced voltages, a goniometer, means for applying said voltages to said goniometer, and bearing indicating means coupled to said goniometer for indicating said receiving means position.

9. A receiving system for indicating direction with respect to a transmitter system, wherein a plurality of radiations of different radio frequencies and a sense frequency radiation are varied in intensity in a predetermined manner by a common modulating frequency to produce a rotating directional field radiation pattern comprising antenna means for receiving energy of said frequencies, a goniometer, and an indicator, means coupled to said antenna means for separating said plurality of frequencies, means for detecting and combining said separated frequencies to produce quadrature phase spaced signals, means for applying said quadrature phase spaced signals to the stators of said goniometer, means coupled to said antenna means for applying said sense frequency to the rotor of said goniometer, means for rotating said rotor at a modulation frequency, means for synchronizing said indicator means with said rotating means, and means for applying said modulated rotor output to said indicator means whereby the direction of said rotating field producing means is indicated.

10. A receiving system for indicating direction with respect to a transmitter system, wherein a plurality of radiations of different radio frequencies and a sense frequency radiation are varied in intensity in a predetermined manner by a common modulating frequency to produce a rotating directional field radiation pattern comprising a single omnidirectional antenna, a goniometer, and an indicator, intermediate frequency channels for each of said frequencies, each of said intermediate frequency channels comprising automatic volume control means, means for coupling said antenna to the input of said channels, means for detecting and combining the output of said channels receiving said plurality of frequencies to produce quadrature phase spaced signals, means for applying said quadrature phase spaced signals to the stators of said goniometer, means for applying the intermediate frequency output of said sense frequency to the rotor of said goniometer, means for rotating said rotor at a modulation frequency, means for synchronizing said indicator means with said rotating means, and means for applying said modulated rotor output to said indicator means whereby the direction of said rotating field producing means is indicated.

11. A transmitter system, and a receiving system for indicating direction with respect to said transmitter system, said transmitter system comprising means for producing a plurality of radiations of different radio frequencies and a sense frequency radiation, means for varying the intensity of all of said radiations in a predetermined manner by a common modulating frequency to produce a rotating directional field radiation, said receiver comprising omnidirectional antenna means for receiving energy of said frequencies, a radio goniometer, an indicator means, means coupled to said antenna means for separating said plurality of frequencies, means for detecting and combining said separated frequencies to produce quadrature phase spaced signals, means for applying said quadrature phase spaced signals to the stators of said goniometer, means coupled to said antenna means for applying said sense frequency to the rotor of said goniometer, means for rotating said rotor at a modulation frequency, means for synchronizing said indicator means with said rotating means and means for applying said modulated rotor output to said indicator means whereby the direction of said rotating field producing means is indicated.

12. A transmitter system, and a receiving system for indicating direction with respect to said transmitter system, said transmitter system comprising means for producing a plurality of radiations of different radio frequencies and a sense frequency radiation, means for varying the intensity of all of said radiations in a predetermined manner by a common modulating frequency, to produce a rotating directional field radiation pattern, said receiver comprising antenna means for receiving energy of said frequencies, a field producing device, means coupled to said antenna means for separating said frequencies, means for detecting and combining said separated frequencies to produce phase spaced signals, means for applying said phase spaced signals to said field producing device, whereby a resultant field is obtained having a field strength pattern descriptive of said rotating pattern, means for searching said resultant field whereby the direction of said rotating field producing means is indicated.

13. A transmitter system, and a receiving system for indicating direction with respect to said transmitter system, said transmitter system comprising means for producing a plurality of radiations of different radio frequencies and a sense frequency radiation, means for varying the intensity of all of said radiations in a predetermined manner by a common modulating frequency to produce a rotating directional field radiation, said receiver comprising a single omnidirectional antenna, a radio goniometer, an indicator means, intermediate frequency channels for each of said frequencies, each of said channels comprising automatic volume control means, means for coupling said antenna to the input of said channels, means for detecting and combining the outputs of each of said channels receiving said plurality of frequencies to produce quadrature phase spaced signals, means for applying said quadrature phase spaced signals to the stators of said goniometer, means for applying the intermediate frequency output of said sense frequency to the rotor of said goniometer, means for rotating said rotor at a modulation frequency, means for synchronizing said indicator means with said rotating means and means for applying said modulated rotor output to said indicator means whereby the direction of said rotating field producing means is indicated.

AVERY GROAT RICHARDSON.
FRANK O. CHESUS.

REFERENCES CITED

The following references are of record in the file of this patent:

UNITED STATES PATENTS

| Number | Name | Date |
| --- | --- | --- |
| 2,288,815 | Luck | July 7, 1942 |
| 2,438,946 | Richardson et al. | Apr. 6, 1948 |